(12) United States Patent
Wark

(10) Patent No.: US 11,772,571 B2
(45) Date of Patent: Oct. 3, 2023

(54) SKI RACK FOR INTERIOR OF VEHICLE

(71) Applicant: Cynthia Wark, Aspen, CO (US)

(72) Inventor: Cynthia Wark, Aspen, CO (US)

( * ) Notice: Subject to any disclaimer, the term of this patent is extended or adjusted under 35 U.S.C. 154(b) by 244 days.

(21) Appl. No.: 17/508,039

(22) Filed: Oct. 22, 2021

(65) Prior Publication Data
US 2023/0127436 A1 Apr. 27, 2023

(51) Int. Cl.
B60R 11/00 (2006.01)
B60R 5/00 (2006.01)
B60N 2/36 (2006.01)

(52) U.S. Cl.
CPC ............ B60R 11/00 (2013.01); B60R 5/006 (2013.01); B60N 2002/363 (2013.01); B60R 2011/008 (2013.01); B60R 2011/0012 (2013.01); B60R 2011/0015 (2013.01); B60R 2011/0059 (2013.01); B60R 2011/0063 (2013.01); B60R 2011/0071 (2013.01); B60R 2011/0075 (2013.01)

(58) Field of Classification Search
None
See application file for complete search history.

(56) References Cited

U.S. PATENT DOCUMENTS

| | | | |
|---|---|---|---|
| 2,721,680 A | 10/1955 | Steckman | |
| 3,746,224 A | 7/1973 | Folgner | |
| 3,792,805 A * | 2/1974 | Binding | B60R 9/12 224/329 |
| 4,056,220 A | 11/1977 | Trimble | |
| 4,128,268 A * | 12/1978 | Sundlof | B60R 7/085 296/10 |
| 4,271,997 A | 6/1981 | Michael | |
| 4,733,901 A | 3/1988 | Okuyama | |
| 4,941,702 A | 7/1990 | Southward | |
| 4,955,519 A * | 9/1990 | Forrester | B60R 9/12 224/315 |
| 5,599,054 A | 2/1997 | Butz et al. | |
| 5,628,543 A | 5/1997 | Filipovich et al. | |
| 5,662,253 A | 9/1997 | Goings | |
| 5,957,353 A | 9/1999 | Clement | |
| 6,076,880 A | 6/2000 | Coffer et al. | |
| 6,540,295 B1 * | 4/2003 | Saberan | B60N 2/206 297/344.21 |
| 8,235,269 B2 | 8/2012 | Rupar et al. | |
| 9,168,850 B2 | 10/2015 | Meszaros et al. | |
| 11,602,982 B2 * | 3/2023 | Singer | B60J 7/198 |

(Continued)

FOREIGN PATENT DOCUMENTS

| | | | | |
|---|---|---|---|---|
| DE | 10339730 A1 * | 3/2005 | ............ | B60N 2/206 |
| GB | 2567260 A * | 4/2019 | ............ | B60N 2/002 |

(Continued)

Primary Examiner — David E Allred
(74) Attorney, Agent, or Firm — Leyendecker & Lemire, LLC

(57) ABSTRACT

A ski rack configured for an interior of a vehicle is described. Embodiments of the ski rack include a main body and at least one strap. The ski rack can be adapted to secure to a backside of a rear seat in a vehicle and receive one or more pairs of skis thereon. The main body of the ski rack can include a front section sloping up to a second flat section. The at least one strap can be located in the second section and can be implemented to secure the pairs of skis to the ski rack.

20 Claims, 6 Drawing Sheets

(56) References Cited

U.S. PATENT DOCUMENTS

| | | | | |
|---|---|---|---|---|
| 2001/0042766 | A1* | 11/2001 | Ming-Shun | B60R 9/058 |
| | | | | 224/325 |
| 2003/0057724 | A1* | 3/2003 | Inagaki | B60R 5/04 |
| | | | | 296/37.16 |
| 2003/0062759 | A1* | 4/2003 | Gupta | B60N 2/3013 |
| | | | | 297/452.65 |
| 2006/0065686 | A1* | 3/2006 | Furtado | B60R 9/048 |
| | | | | 224/319 |
| 2006/0081670 | A1 | 4/2006 | Sitzler et al. | |
| 2011/0133508 | A1* | 6/2011 | Zuelch | B60R 5/006 |
| | | | | 296/65.16 |
| 2013/0001988 | A1* | 1/2013 | Lucas | B60N 2/36 |
| | | | | 296/146.8 |
| 2014/0265418 | A1* | 9/2014 | Thota | B60N 2/206 |
| | | | | 297/188.05 |
| 2021/0009016 | A1* | 1/2021 | Edwards | B60N 2/3009 |
| 2022/0063506 | A1* | 3/2022 | Sampou | B60R 9/12 |
| 2022/0126759 | A1* | 4/2022 | Robinson | B60R 9/12 |
| 2023/0134010 | A1* | 5/2023 | Sampou | B60R 9/042 |
| | | | | 414/462 |
| 2023/0180732 | A1* | 6/2023 | Champa | A01K 97/06 |
| | | | | 43/21.2 |

FOREIGN PATENT DOCUMENTS

| | | | | |
|---|---|---|---|---|
| WO | 9728019 | | 8/1997 | |
| WO | 2005002925 | | 3/2005 | |
| WO | WO-2016030639 | A1* | 3/2016 | B60N 3/06 |

\* cited by examiner

SKI RACK FOR INTERIOR OF VEHICLE

BACKGROUND

Currently, skis are transported loosely inside a vehicle, attached to an exterior ski rack, or inside a cargo box mounted on a roof of the vehicle. Often times it is easier for a skier to place their skis inside the vehicle than placing them on a roof mounted rack or cargo box. Further, by placing the skis inside the vehicle, the skis are not introduced to dirt, grime, and chemicals (e.g., de-icer) often found on roads when being transported. However, skis placed in a random fashion inside a vehicle will rattle and bounce around, potentially causing damage to the skis and/or an interior of the vehicle. Potentially more dangerous, is the skis moving around unobstructed during an accident or sudden stop.

A device for organizing and securing skis in an interior of a vehicle is needed.

DETAILED DESCRIPTION

Figure 1A:
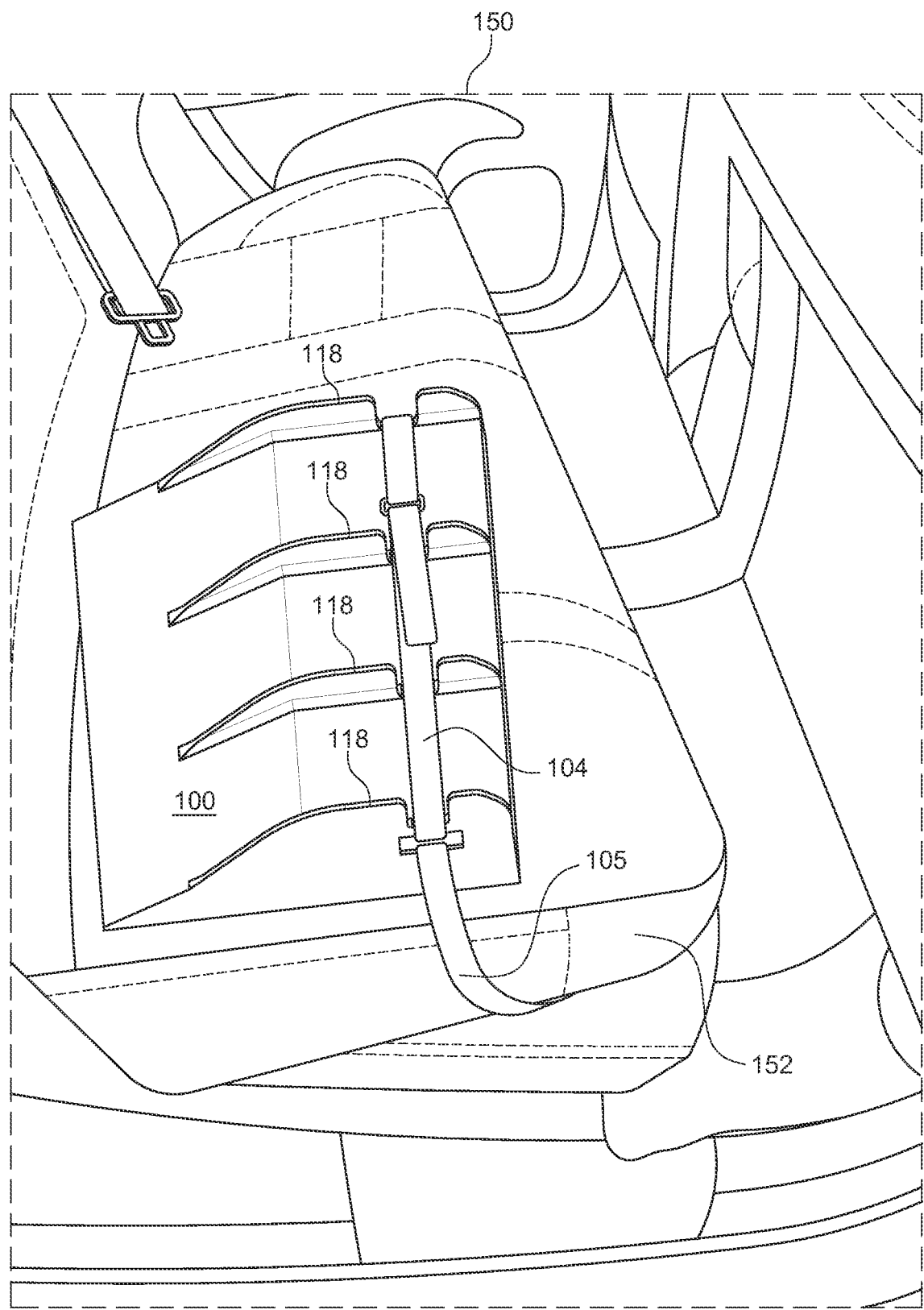
FIG. 1A is a side view of a ski rack in an interior of a vehicle according to one embodiment of the present invention.

Embodiments of the present invention include a ski rack configured to be removably secured to a backside of an automobile seat. Of note, the ski rack can be secured to the automobile seat when the seat is either in an upright or a down position. As can be appreciated, this can allow for the ski rack to be available when needed and kept in place when not needed. Embodiments are contemplated where one or more pairs of skis can be coupled to the ski rack inside an automobile. An elevated flat surface of the ski rack can elevate tips of skis to ensure they do not touch the vehicle interior. Further, the elevated flat surface can allow for a pair of skis to be secured to the ski rack with the bindings facing up and down.

In one embodiment, the ski rack can include, but is not limited to, a main body, one or more attachment mechanisms, and a fastening member. The main body can be defined by a substantially rectangular footprint with a front section having a sloped surface to an elevated back section having a substantially flat surface. The back section can be elevated above a bottom of the main body to allow for skis to rest on bindings attached to the skis. The sloped front section can allow for skis to be pushed onto and up towards the back section. The back section can include a plurality of protrusions to segment the ski rack for individual pairs of skis. The one or more attachment mechanisms can include, but are not limited to, a hook and loop fastener and a strap. The hook and loop fastener can be implemented to secure the ski rack to a carpeted seatback. The strap can be implemented where there is no carpet and/or as an added means for securing the ski rack to a seatback. The fastening member can typically be a strap adapted to secure one or more pairs of skis to the ski rack.

An overall width of the ski rack can be determined based on the number of skis to be secured. In one instance, the ski rack can be sized to fit two pairs of skis. In another instance, the ski rack can be sized to fit three pairs of skis. It is to be appreciated that a size of the ski can be scaled to fit at least one pair of skis up to 3 or more pairs of skis.

The main body can generally be manufactured from a lightweight rigid material. For instance, rigid plastics can be implemented to make the main body. In one instance, the main body can be a hollow frame including a top surface, a first sidewall, a second sidewall, a backwall, and a plurality of guide members. In another instance, the main body can be a solid block of material. To help guide skis up the main body, the sloped front section of the main body can typically have a smooth surface to allow ski tips to easily glide up and over the main body. To help keep the pair of skis stable once in place, a top surface of the elevated back section may include patches of grippy material to keep the skis from moving. For instance, strips of rubber or a similar material can be adhered to the top surface of the back section. In another instance, the back section can include depressions for receiving the strips of rubber therein such that the strips of rubber do not protrude above the top surface very much. It is to be appreciated that materials similar to rubber can be implemented and are not outside a scope of the present disclosure.

In a typical implementation, the ski rack can first be secured to the back of an automobile seat. A back row seat (or middle seat) can typically be selected for the ski rack to attach to. For automobiles that have carpeted back seats, a hook and loop closure secured to a bottom of the ski rack can be implemented to secure the ski rack to the carpeted seat. In addition, a strap can be used to wrap around the seat and secure the ski rack to the seat. After the ski rack has been secured to the seat, the seat can be laid down with the front section of the ski rack facing the rear of the automobile. When a user is ready to secure skis to the ski rack, the user can slide the skis along a trunk of the automobile to the ski rack. The sloped front section can allow for the ski to engage the ski rack and slide easily up and past the back end of the ski rack. Of note, since the ski rack back section is elevated, a user can place a pair of skis with one binding facing down to allow the pair of skis to rest on the bindings and the ski rack. After the tips of the skis are slightly past an end of the ski rack, the user can secure the skis to the ski rack. In one instance, a strap can be implemented to secure the skis to the ski rack. Typically, the strap can be adjusted in length to allow a user to tightly engage the skis to the ski rack.

In one example embodiment, the ski rack can include, but is not limited to, a main body, a hook and loop fastener, and a strap. The main body can be configured to secure to a seat of a vehicle. The main body can be defined by: a substantially rectangular base; a top surface (i) sloped upwards from a front end to a midpoint of the main body, and (ii) extending horizontally from the midpoint to a back end of the main body; and a plurality of guide members extending vertically from at least a portion of the top surface. The hook and loop fastener can be secured to the substantially rectangular base of the main body. The strap can be configured to removably secure one or more skis to top surface of the main body.

In another example embodiment, the ski rack can include, but is not limited to, a main body, a first strap, and a second strap. The main body can be configured to secure to a backside of a seat in a vehicle. The main body can be defined by a substantially rectangular base, a front end having a first height, a back end having a second height, a top surface sloping from the first height to the second height, and a plurality of guide members extending vertically from at least a portion of the top surface. The first strap can be configured to removably couple the main body to the seat. The second strap can be configured to removably secure one or more skis to the top surface of the main body.

In yet another example, the ski rack can include, but is not limited to, a main body, a hook and loop fastener, a first strap, and a second strap. The main body can be configured to secure to a seat in a vehicle. The main body can be defined by a top surface having a sloped portion and a flat portion, the sloped portion starting at a front end of the main body and the flat portion ending at a back end of the main body, and a plurality of guide members extending vertically from at least a portion of the top surface. The hook and loop fastener can be secured to a bottom of the main body and can be configured to couple the ski rack to a seatback of the seat. The first strap can be configured to removably secure one or more skis to the top surface of the main body. The second strap can be configured to removably secure the main body to the seat.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

An Embodiment of a Ski Rack

Figure 1B:
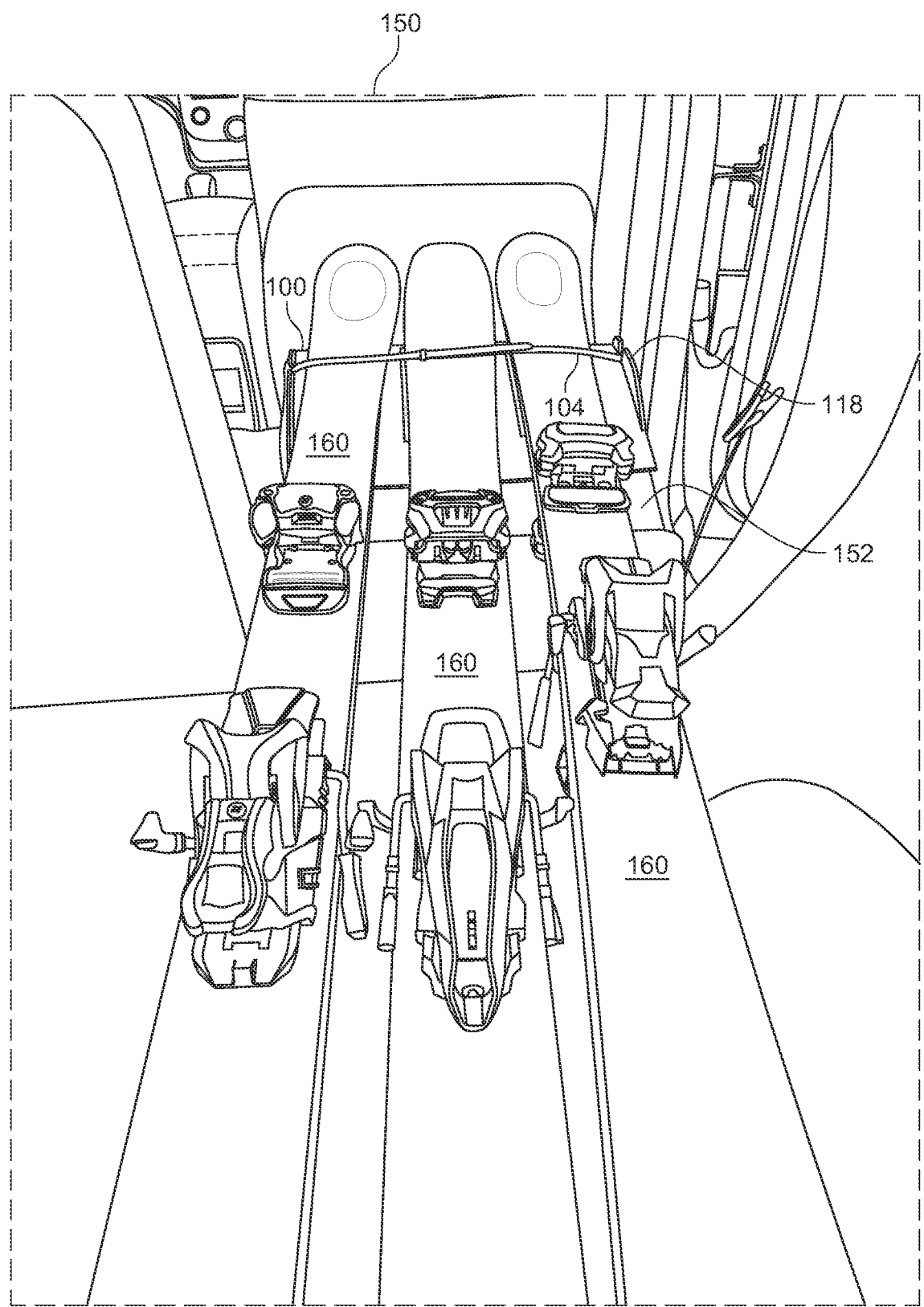
FIG. 1B is a back view of a plurality of skis secured to a ski rack in an interior of a vehicle according to one embodiment of the present invention.
Figure 1C:
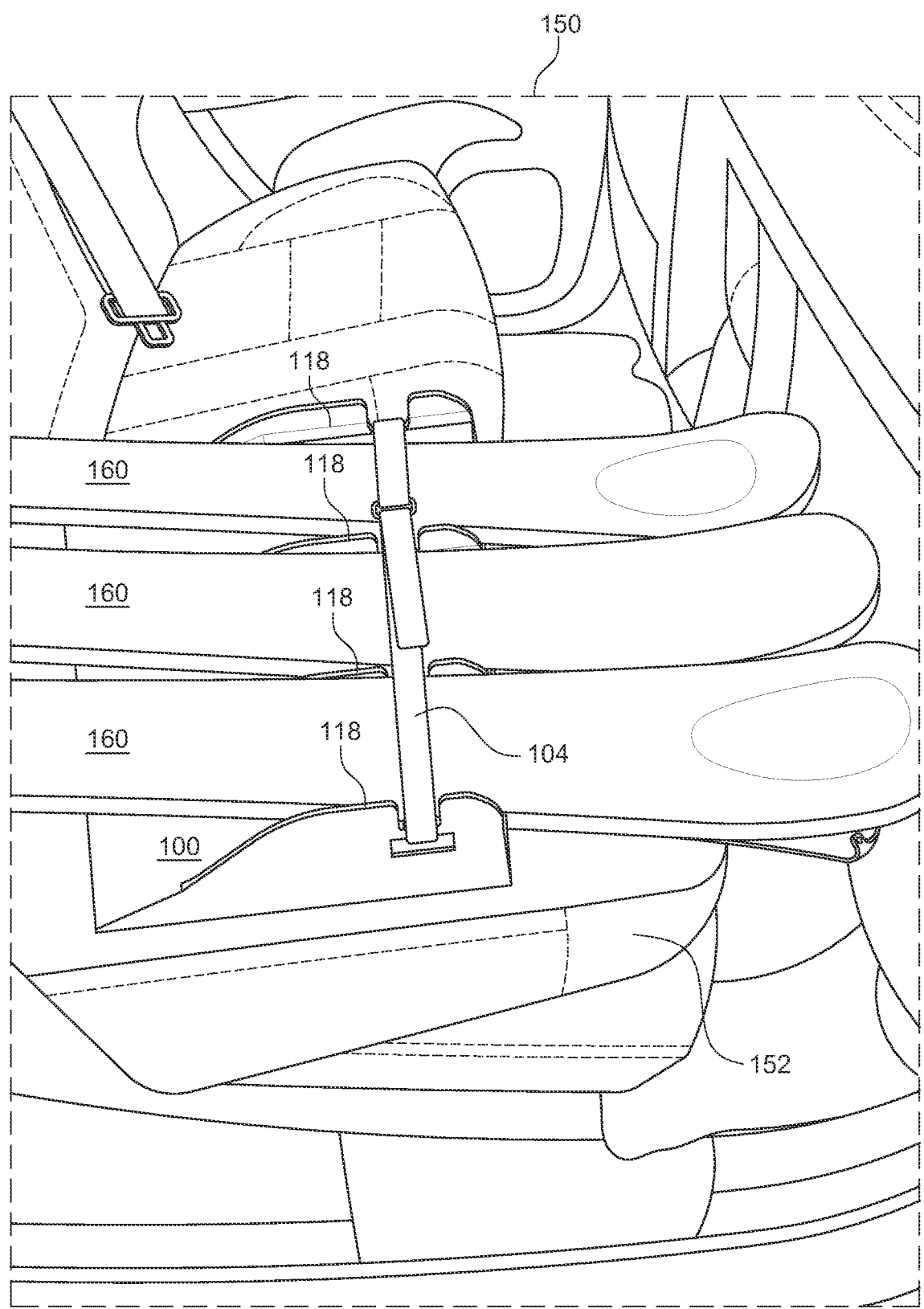
FIG. 1C is a side view of a plurality of skis secured to a ski rack in an interior of a vehicle according to one embodiment of the present invention.

Referring to FIGS. 1A-1C, detailed diagrams of an embodiment 100 of a ski rack are illustrated. The ski rack 100 can be implemented to organize and secure skis inside a vehicle. Typically, the ski rack 100 can orient a pair of skis with bindings of the skis facing down and up and can be removably secured in an interior of a vehicle 150. FIG. 1A includes a side view of the ski rack 100 secured to a seatback of a seat 152 in an interior of the vehicle 150. FIG. 1B includes a back view of the ski rack 100 in the vehicle 150 being secured to the seatback of the seat 152. FIG. 1C includes a side view of the ski rack 100 in the vehicle 150 secured to the seatback of the seat 152.

As shown generally in FIGS. 1A-1C, the ski rack 100 can include, but is not limited to, a main body 102 and a strap 104. In some embodiments, a seat strap 105 can be provided. The main body 102 can be configured to interface with one or more pairs of skis and elevate tips of the skis. The strap 104 can be implemented to secure skis to the main body 102. The seat strap 105 can be implemented to secure the main body 102 of the ski rack 100 to the seatback of the seat 152.

The strap 104 can typically include a means for tightening (or shortening a length of the strap) to secure a pair of skis to the main body 102. In one instance, the strap 104 can be a nylon strap including an adjustable fastening mechanism. For example, a nylon strap with a slide buckle can be implemented. In another example, a nylon strap with a side release buckle can be implemented. It is to be appreciated that a plurality of different fastening mechanisms are contemplated and not outside a scope of the present disclosure. In another instance, the strap 104 may include ends with hook and loop patches to secure to one another. In yet another instance, the strap 104 may be a rubber strap including an adjustable fastening mechanism. Similarly, the seat strap 105 can include a fastening mechanism for tightening the seat strap 105 to a seatback of a seat.

Figure 2A:
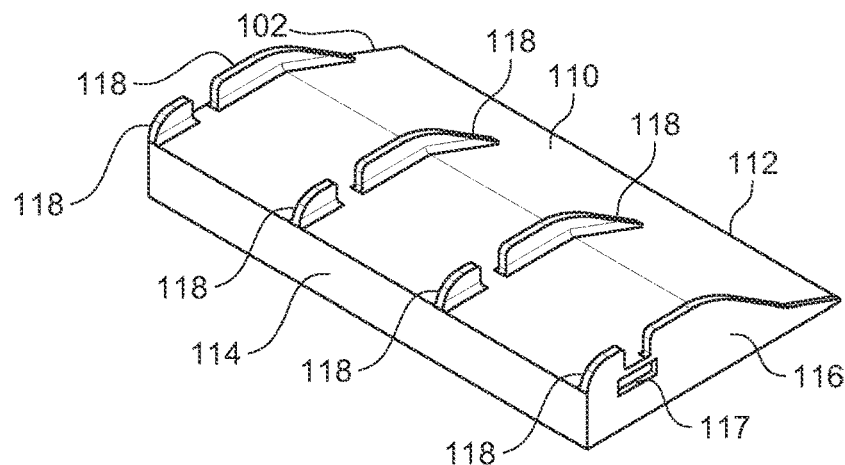
FIG. 2A is a back perspective view of a ski rack according to one embodiment of the present invention.
Figure 2B:
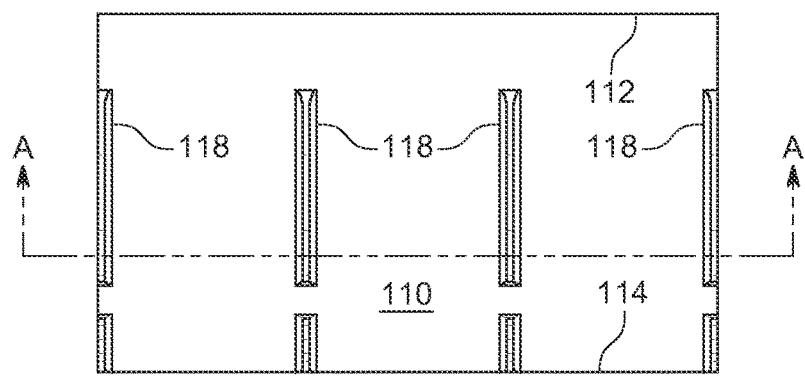
FIG. 2B is a top view of a ski rack including a cross-section line A-A according to one embodiment of the present invention.
Figure 2C:
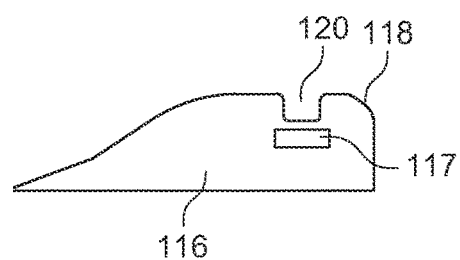
FIG. 2C is a side view of a ski rack according to one embodiment of the present invention.
Figure 2D:
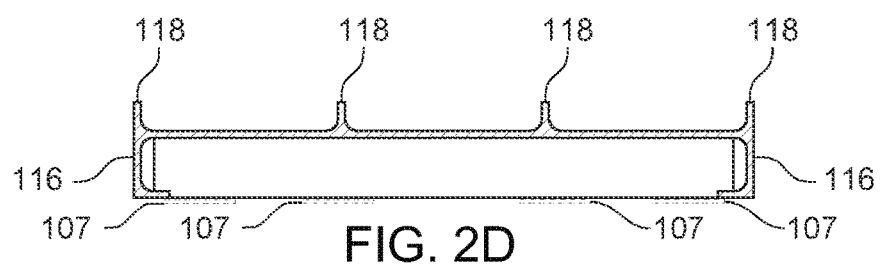
FIG. 2D is a cross-sectional view along line A-A of FIG. 2B of a ski rack according to one embodiment of the present invention.

Referring to FIGS. 2A-2D, detailed diagrams of the ski rack 100 are illustrated. FIG. 2A is a back perspective view of the ski rack 100. FIG. 2B is a top view of the ski rack 100 including cross-sectional line A-A. FIG. 2C is a side view of the ski rack 100. FIG. 2D is cross-sectional view along line A-A in FIG. 2B.

In one embodiment, the main body 102 can be defined by a rectangular footprint with a top surface 110 rising from a front 112 of the main body 102 to a back end 114 of the main body 102. In one instance, the top surface 110 can rise to a midpoint of the main body 102 and may then be parallel with a bottom surface of the main body 102 from the midpoint to the back end 114 of the main body 102. The main body 102 can further include a pair of sidewalls 116 extending from the front end 110 of the main body 102 to the back end 114 of the main body 102. Generally, a top of the sidewalls 116 can help define a contour of the top surface 110. The pair of sidewalls 116 can each include a slot 117 for receiving a portion of the strap 104 therethrough. As can be appreciated, the strap 104 can be coupled to the main body 102 via the slots 117. For example, the strap 104 can pass through the pair of slots 117 and encircle the top surface 110 of the main body 102. The seat strap 105 may also pass through the slots 117 of the main body 102. For example, the seat strap 105 can pass through the pair of slots 117 and encircle a bottom of the main body 102 and a seatback of the seat 152.

The main body 102 can further include a plurality of guide members 118 extending vertically from the top surface 110 of the main body 102. The plurality of guide members 118 can be implemented to determine where each pair of skis may be placed. For instance, the guide members 118 can be implemented to segregate the main body 102 to dictate where skis may be positioned. The plurality of guide members 118 can create designated spaces where each pair of skis can be placed. As shown, the main body 102 can include 3 designated spaces for receiving 3 pairs of skis thereon. In one instance, each of the plurality of guide members 118 can include a gap where the gaps form a channel 120 for the strap 104 to settle into. Typically, the gaps in the plurality of guide members 118 can be aligned with the slots 117 in the sidewalls 116 of the main body 102. As can be appreciated, this can ensure the channel 120 may be aligned with the strap 104.

In one example embodiment, the main body 102 can include a first guide member extending up from one of the sidewalls 116 of the main body 102, a second guide member extending up from the other sidewall 116 of the main body 102, and at least one guide member located between the first guide member and the second guide member.

Generally, the main body 102 can be dissected into a front section and a back section. The top surface 110 can extend from the front end 112 of the main body 102 to the back end 112 of the back section. The top surface 110 can typically be sloped in the front section and can then level off and be substantially horizontal in the back section. The flat top surface 110 of the back section can be configured to receive one or more pairs of skis to rest thereon. The sloped top surface 110 can be configured to interface with and guide a tip of a ski from the front end 112 of the main body 102 to at least a midpoint of the main body 102. As can be appreciated, the ski tips would interface with the flat top surface 110 after the midpoint of the main body 102 until the ski tips pass the back end 114 of the main body 102.

In one embodiment, the main body 102 can further include one or more patches of hook and loop fastener 107 secured to a bottom of the main body 102, as shown in FIG. 2D. The hook and loop fastener 107 can be implemented to couple the main body 102 to a carpeted backside of a vehicle seat. Depending on a construction of the main body 102, patches of hook and loop fastener or strips of hook and loop fastener may be implemented. In one instance, a perimeter of a bottom of the main body 102 can include hook and loop fastener material. In another instance, one or more patches of hook and loop fastener material can be placed on the bottom of the main body 102.

Referring back to FIGS. 1B-1C, as generally shown, a plurality of pairs of skis 160 can be secured to the ski rack 100 via the strap 104. The guide members 118 can be implemented to separate the skis 160 on the ski rack 100 to help ensure the skis do not interface with each other. Generally, the skis 160 can be oriented with bindings facing down and up such that the ski on the bottom can have the binding facing down to interface with an interior of the vehicle 150. Of note, the ski rack 100 can be sized such that most skis can lie level when resting on their binding and the ski rack 100. Although 3 pairs of skis are shown, it is to be appreciated that 1 or 2 pairs of skis may be implemented with the ski rack 100.

To install the ski rack 100, a seatback of the seat 152 can be rotated forwards and down such that the seatback may be laying substantially horizontal. The ski rack 100 may then be secured to the seatback of the seat 152 via hook and loop fastener secured to a bottom of the ski rack 100. In another instance, the ski rack 100 can be secured to the seatback 152 via the seat strap 105 that may be sized to extend around the seatback and secure the ski rack 100 thereto. It is to be appreciated that other means of securing the ski rack 100 to the seat 152 are contemplated and not outside a scope of the present invention.

In one example embodiment, the ski rack 100 can be approximately 10 inches wide by 18 inches long by 3 inches high. A distance between the plurality of guide members 118 can be approximately 5½ inches. The plurality of guide members 118 can be approximately ¾ inches high. The channel 120 formed by the plurality of guide members 118 can be approximately 1 inch wide. The front section can be approximately 5 inches wide and the back section can be approximately 5 inches wide.

Figure 3:
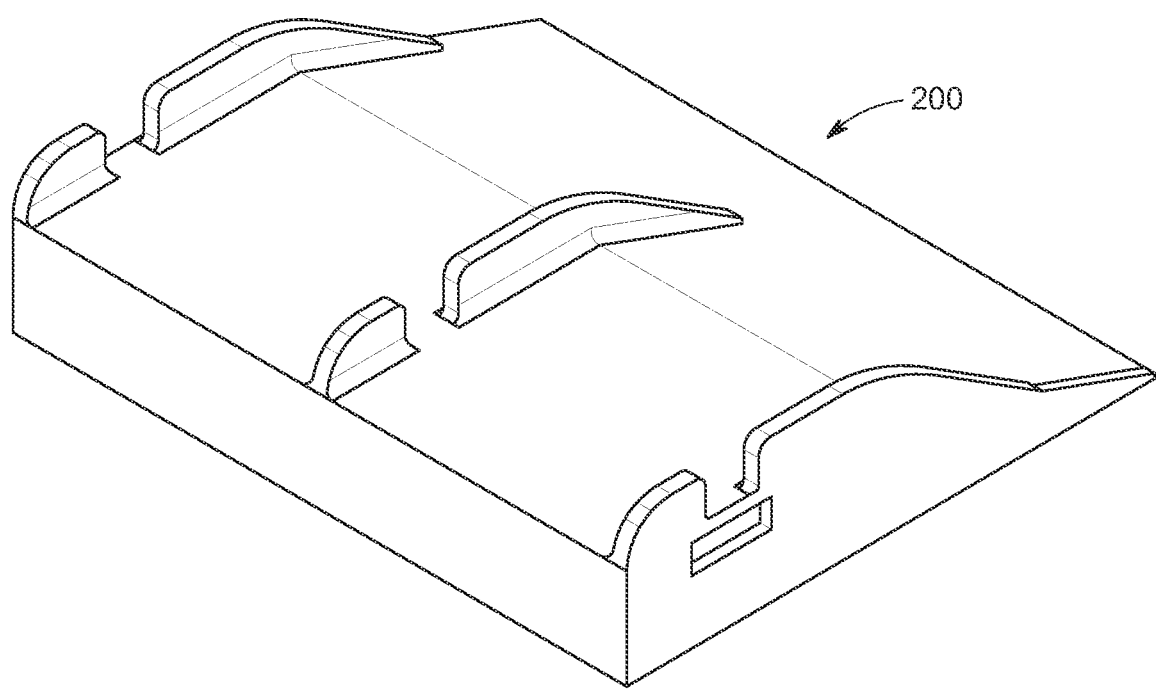
FIG. 3 is a back perspective view of a ski rack according to one embodiment of the present invention.

Referring to FIG. 3, a second embodiment 200 of a ski rack is illustrated. The second embodiment ski rack 200 can be substantially similar to the first embodiment ski rack 100 and include each of the components of the first embodiment ski rack 100. The second embodiment ski rack 200 can be sized to fit 2 pairs of skis on the ski rack 200.

In one example embodiment, the ski rack 200 can be approximately 10 inches wide by 12 inches long by 3 inches high. A distance between the plurality of guide members can be approximately 5½ inches. The plurality of guide members can be approximately ¾ inches high. The channel formed by the plurality of guide members can be approximately 1 inch wide. The front section can be approximately 5 inches wide and the back section can be approximately 5 inches wide.

Figure 4:
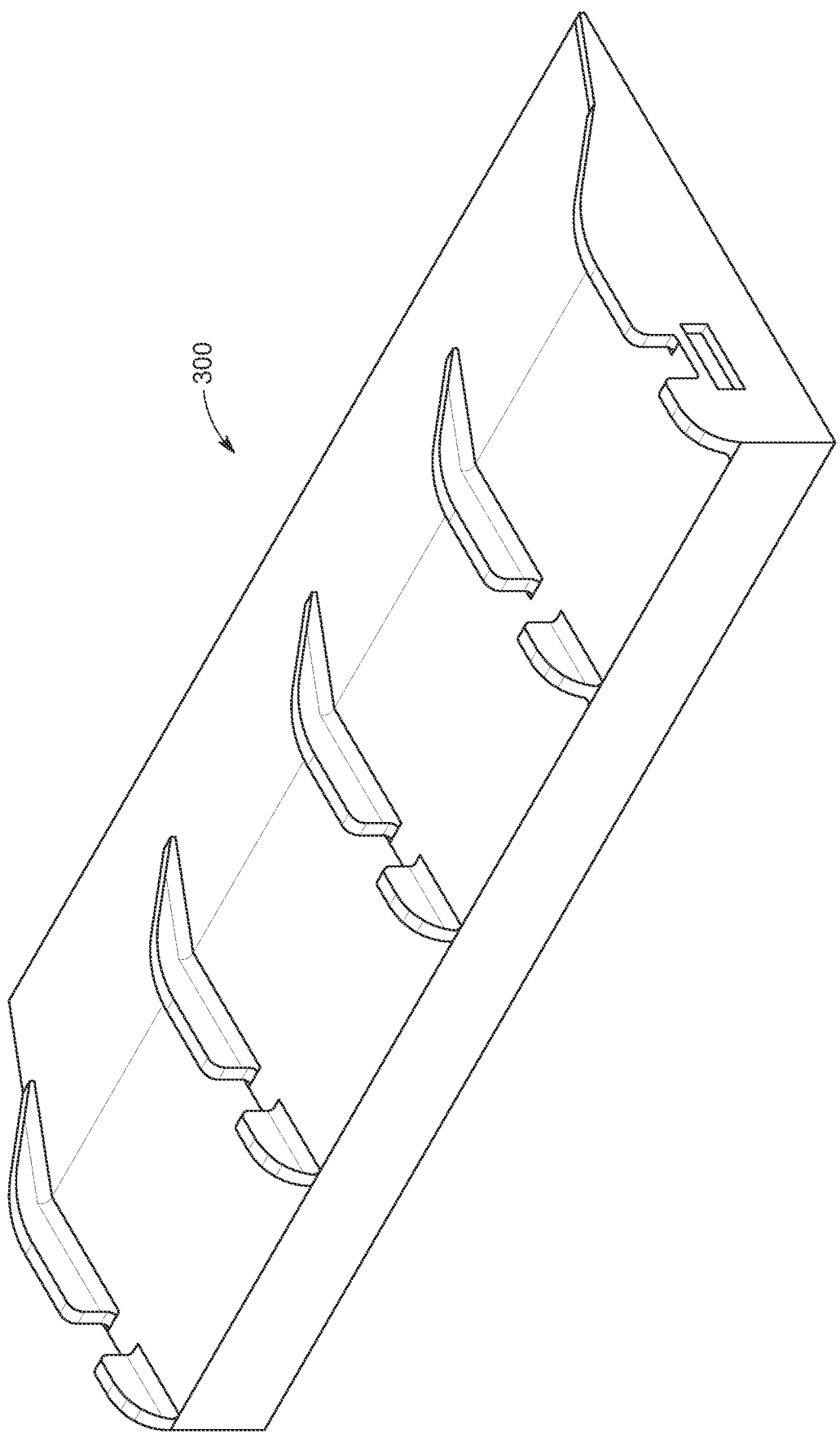
FIG. 4 is a back perspective view of a ski rack according to one embodiment of the present invention.

Referring to FIG. 4, a third embodiment 300 of a ski rack is illustrated. The third embodiment ski rack 300 can be substantially similar to the first embodiment ski rack 100 and include each of the components of the first embodiment ski rack 100. The third embodiment ski rack 300 can be sized to fit 4 pairs of skis on the ski rack 400.

In one example embodiment, the ski rack 300 can be approximately 10 inches wide by 24 inches long by 3 inches high. A distance between the plurality of guide members can be approximately 5½ inches. The plurality of guide members can be approximately ¾ inches high. The channel formed by the plurality of guide members can be approximately 1 inch wide. The front section can be approximately 5 inches wide and the back section can be approximately 5 inches wide.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A ski rack for an interior of a vehicle, the ski rack comprising:
   a main body configured to secure to a seat in the vehicle, the main body in a position of use being defined by:
   a substantially rectangular base;
   a top surface (i) sloped upwards from a front end to a midpoint of the main body, and (ii) extending horizontally from the midpoint to a back end of the main body; and
   a plurality of guide members extending vertically from at least a portion of the top surface;
   a first strap configured to removably couple the main body to the seat; and
   a second strap configured to removably secure one or more skis to the top surface of the main body.

2. The ski rack of claim 1, wherein the main body further includes a first sidewall and a second sidewall each having a slot for receiving the strap therethrough.

3. The ski rack of claim 2, wherein a first guide member is located proximate the first sidewall and a second guide member is located proximate the second sidewall.

4. The ski rack of claim 3, wherein a third guide member is located between the first guide member and the second guide member.

5. The ski rack of claim 1, wherein a channel extends through the plurality of guide members for the second strap.

6. The ski rack of claim 1, wherein the ski rack is configured to receive and secure 3 pairs of skis thereon.

7. The ski rack of claim 1, wherein the ski rack is configured to receive and secure 2 pairs of skis thereon.

8. The ski rack of claim 1, wherein the ski rack further includes:
   a hook and loop fastener secured to the substantially rectangular base of the main body.

9. The ski rack of claim 1, wherein the strap is a nylon strap including a slide buckle.

10. A ski rack for an interior of a vehicle, the ski rack comprising:
    a main body configured to secure to a backside of a seat in the vehicle, the main body in a position of use being defined by:
    a substantially rectangular base;
    a front end having a first height;
    a back end having a second height;
    a top surface sloping upwardly from the first height to the second height; and
    a plurality of guide members extending vertically upward from at least a portion of the top surface;
    a first strap configured to removably couple the main body to the seat; and
    a second strap configured to removably secure one or more skis to the top surface of the main body.

11. The ski rack of claim 10, wherein the main body further includes a pair of sidewalls, each of the sidewalls having a slot.

12. The ski rack of claim 11, wherein the first strap and the second strap each pass through the slots.

13. The ski rack of claim 10, wherein the first strap includes a slide release buckle.

14. The ski rack of claim 10, wherein the main body is hollow.

15. A ski rack for an interior of a vehicle, the ski rack comprising:
    a main body configured to secure to a seat in the vehicle, the main body being defined in a position of use by:
    a top surface having (i) a sloped portion extending upwardly starting at a front end of the main body and ending at a midpoint of the main body and (ii) a flat portion starting at the midpoint of the main body and ending at a back end of the main body; and
    a plurality of guide members extending vertically from at least a portion of the top surface;
    a hook and loop fastener secured to a bottom of the main body;
    a first strap configured to removably secure one or more skis to the top surface of the main body; and
    a second strap configured to removably secure the main body to the seat.

16. The ski rack of claim 15, wherein the plurality of guide members form 3 designated spaces, each of the designated spaces adapted to receive a pair of skis thereon.

17. The ski rack of claim 15, wherein the main body further includes a pair of slots located on sidewalls of the main body.

18. The ski rack of claim 17, wherein the first strap passes through the pair of slots and encircles the top surface.

19. The ski rack of claim 17, wherein the second strap passes through the pair of slots and encircles a bottom of the main body and a seatback of the seat.

20. The ski rack of claim 15, wherein the plurality of guide members includes a first set of guide members located proximate a back end of the main body and a second set of guide members located proximate a middle of the main body.

* * * * *